(12) United States Patent
Kompalli et al.

(10) Patent No.: US 9,081,412 B2
(45) Date of Patent: Jul. 14, 2015

(54) SYSTEM AND METHOD FOR USING PAPER AS AN INTERFACE TO COMPUTER APPLICATIONS

(75) Inventors: Suryaprakash Kompalli, Bangalore (IN); Kiran Kumar Bhuvanagiri, Bangalore (IN); Anjaneyulu Seetha Rama Kuchibhotla, Bangalore (IN); Sitaram Ramachandrula, Bangalore (IN); Sriganesh Madhvanath, Bangalore (IN); Shekhar Ramachandra Borgaonkar, Bangalore (IN); Balasubramanian Anand, Bangalore (IN)

(73) Assignee: HEWLETT-PACKARD DEVELOPMENT COMPANY, L.P., Houston, TX (US)

(\*) Notice: Subject to any disclaimer, the term of this patent is extended or adjusted under 35 U.S.C. 154(b) by 1246 days.

(21) Appl. No.: 12/954,631

(22) Filed: Nov. 25, 2010

(65) Prior Publication Data
US 2012/0026081 A1 Feb. 2, 2012

(30) Foreign Application Priority Data
Jul. 31, 2010 (IN) .......................... 2185/CHE/2010

(51) Int. Cl.
*G09G 5/00* (2006.01)
*G06F 3/041* (2006.01)
(Continued)

(52) U.S. Cl.
CPC .............. *G06F 3/002* (2013.01); *G06F 3/0317* (2013.01); *G06F 8/34* (2013.01); *H04N 1/00968* (2013.01)

(58) Field of Classification Search
CPC ................... G06F 2203/0381; G06F 3/04883; H04N 1/00355; H04N 1/00374; H04N 1/00214; H04N 1/00217; H04N 1/00241; H04N 1/00307; H04N 1/00358; H04N 1/0036; H04N 1/00366; H04N 1/00371; H04N 1/00379; H04N 1/32042; B41J 3/445; B41J 3/46
USPC .................................. 345/156, 169, 173–181
See application file for complete search history.

(56) References Cited

U.S. PATENT DOCUMENTS

| 4,893,333 A | 1/1990 | Baran et al. |
| 5,418,865 A | 5/1995 | Bloomberg |

(Continued)

FOREIGN PATENT DOCUMENTS

| EP | 1404102 | 3/2004 |
| GB | 2410823 B | 8/2007 |

(Continued)

OTHER PUBLICATIONS

Nuance Community, Nuance Communications, Inc.; http://community.nuance.com/wikis/omnipage/workflows.aspx.

(Continued)

*Primary Examiner* — Duc Dinh
(74) *Attorney, Agent, or Firm* — Dicke, Billig & Czaja, PLLC (57) ABSTRACT

A system and method for using paper to interface with handwritten annotations and/or pre-defined templates with one or more computer applications is disclosed. In one embodiment, the method includes imaging content in the paper including pre-defined handwritten commands, associated syntax, one or more computer application identifiers and pointed data which is already existing on the paper, analyzing the imaged content to identify the pre-defined handwritten commands, the one or more computer applications associated with the one or more computer application identifiers, the associated syntax and the pointed data, extracting the pointed data into a specified format associated with the one or more computer applications, executing the one or more computer applications based on the identified pre-defined handwritten commands, the one or more computer application identifiers and the associated syntax, and importing the extracted pointed data into the one or more executed computer applications.

20 Claims, 8 Drawing Sheets (51) Int. Cl.
*G06F 3/00* (2006.01)
*G06F 9/44* (2006.01)
*G06F 3/03* (2006.01)
*H04N 1/00* (2006.01)

(56) References Cited

U.S. PATENT DOCUMENTS

| | | | |
|---|---|---|---|
| 5,867,633 | A | 2/1999 | Taylor, III et al. |
| 6,278,483 | B1 | 8/2001 | Sartor |
| 6,535,298 | B2 | 3/2003 | Winter et al. |
| 6,742,708 | B2 | 6/2004 | Shaked et al. |
| 6,744,529 | B2 | 6/2004 | Winter et al. |
| 6,798,925 | B1 | 9/2004 | Wagman |
| 6,909,805 | B2 | 6/2005 | Ma et al. |
| 6,950,982 | B1 | 9/2005 | Dourish |
| 6,952,803 | B1 | 10/2005 | Bloomberg et al. |
| 6,956,671 | B2 | 10/2005 | Monty et al. |
| 7,142,318 | B2 | 11/2006 | Lopez et al. |
| 7,181,089 | B2 | 2/2007 | Esaki et al. |
| 7,202,861 | B2 * | 4/2007 | Lynggaard .......... 345/179 |
| 7,233,913 | B2 | 6/2007 | Scroggie et al. |
| 7,293,697 | B2 | 11/2007 | Wiebe |
| 7,315,391 | B2 | 1/2008 | Nakano et al. |
| 7,489,415 | B2 | 2/2009 | Furuta |
| 7,525,675 | B2 | 4/2009 | Shelton et al. |
| 7,573,598 | B2 | 8/2009 | Cragun |
| 7,650,568 | B2 | 1/2010 | Williamson |
| 7,878,617 | B2 | 2/2011 | Mizes et al. |
| 8,049,910 | B2 | 11/2011 | Beckman et al. |
| 8,115,948 | B2 * | 2/2012 | Rosenfeld et al. .......... 358/1.15 |
| 8,228,527 | B2 | 7/2012 | Winter et al. |
| 8,233,751 | B2 | 7/2012 | Patel et al. |
| 8,346,023 | B2 * | 1/2013 | Lin ............... 382/321 |
| 2001/0010730 | A1 | 8/2001 | Rhoads |
| 2001/0019416 | A1 | 9/2001 | Monty et al. |
| 2001/0040685 | A1 | 11/2001 | Winter et al. |
| 2002/0033965 | A1 | 3/2002 | Winter et al. |
| 2002/0051201 | A1 | 5/2002 | Winter et al. |
| 2002/0138476 | A1 * | 9/2002 | Suwa et al. .......... 707/3 |
| 2002/0186404 | A1 | 12/2002 | Gragg |
| 2003/0020945 | A1 | 1/2003 | Lopez et al. |
| 2003/0167203 | A1 | 9/2003 | Thorne et al. |
| 2004/0047001 | A1 | 3/2004 | Gehring et al. |
| 2004/0145770 | A1 | 7/2004 | Nakano et al. |
| 2004/0150845 | A1 | 8/2004 | Brouhon |
| 2004/0151399 | A1 | 8/2004 | Skurdal et al. |
| 2004/0205538 | A1 | 10/2004 | Banerjee et al. |
| 2005/0071738 | A1 | 3/2005 | Park |
| 2005/0185204 | A1 | 8/2005 | Shelton et al. |
| 2005/0195447 | A1 | 9/2005 | Os |
| 2005/0231746 | A1 | 10/2005 | Parry et al. |
| 2006/0218496 | A1 | 9/2006 | Kunori |
| 2006/0224950 | A1 | 10/2006 | Takaai |
| 2006/0229940 | A1 | 10/2006 | Grossman |
| 2006/0294450 | A1 | 12/2006 | Barrus et al. |
| 2007/0147680 | A1 | 6/2007 | Lundberg |
| 2007/0188793 | A1 | 8/2007 | Wakai |
| 2008/0018591 | A1 * | 1/2008 | Pittel et al. .......... 345/156 |
| 2008/0273797 | A1 * | 11/2008 | Takikawa et al. .......... 382/188 |
| 2008/0309988 | A1 | 12/2008 | Johnson et al. |
| 2009/0128865 | A1 | 5/2009 | Kuchibhotla et al. |
| 2009/0232398 | A1 | 9/2009 | Martin |
| 2009/0251338 | A1 | 10/2009 | Marggraff |
| 2010/0027896 | A1 | 2/2010 | Geva |
| 2010/0057573 | A1 | 3/2010 | Singhal |
| 2010/0182631 | A1 | 7/2010 | King et al. |
| 2010/0309527 | A1 | 12/2010 | Mandalapu et al. |
| 2010/0318407 | A1 | 12/2010 | Leff et al. |
| 2011/0080608 | A1 | 4/2011 | Do et al. |
| 2011/0235128 | A1 | 9/2011 | Sisco |
| 2011/0276383 | A1 | 11/2011 | Heiser, II et al. |
| 2012/0050790 | A1 | 3/2012 | Hong |
| 2012/0050818 | A1 | 3/2012 | Watanabe |
| 2012/0079409 | A1 | 3/2012 | Luo et al. |
| 2012/0266219 | A1 | 10/2012 | Coleman et al. |
| 2012/0275708 | A1 | 11/2012 | Fritz et al. |
| 2013/0290326 | A1 | 10/2013 | Lebedev |

FOREIGN PATENT DOCUMENTS

| | | | |
|---|---|---|---|
| JP | 2002305701 A | 10/2002 | |
| JP | 2003162383 A | 6/2003 | |
| JP | 2005236983 A | 9/2005 | |
| JP | 2006001287 A | 1/2006 | |
| WO | WO-2010140983 A1 | 12/2010 | |

OTHER PUBLICATIONS http://www.ritescript.com/Manuals/ritePenManual30.aspx#Macros.
CouponTrunk, "Discount Gifts & Flowers Shopping with a Gift Personalized Coupons for 2011," Personalized Gifts Galore, Nov. 5, 2011, <http://web.archive.org/web/20111105064140/http://www.coupontrunk.com/coupon-codes/agiftpersonalized/>.
Nagura et al., "A Facsimile-Based Editing System by Auxiliary Mark Recognition," 1983, IEEE Transactions on Pattern Analysis and Machine Intelligence, vol. 5, issue 4.
Kato et al., "A Handwritten Character Recognition System Using Directional Element Feature and Asymmetric Mahalanobis Distance," Mar. 1999, PAMI, vol. 21, No. 3.
EMC, "EMC Captiva Cloud Toolkit Transforms Web-based Scanning; Achieves Strong Third-party Adoption," Jul. 26, 2012, <http://www.emc.com/about/news/press/2012/20120726-01.htm>.
Jain Fan, "Text extraction via an edge-bounded averaging and a parametric character model," Electronic Imaging 2003, International Society for Optics and Photonics, 2003, pp. 8-19.
Microsoft Developer Network, "Clipboard Formats," Sep. 9, 2010, <http://web.archive.org/web/20100909220445/http://msdn.microsoft.com/en-us/library/ms649013(VS.85).aspx>.
MINT.COM, "Our Product," May 22, 2010, <http://web.archive.org/web/20100522215052/http://www.mint.com/product/>.
The IRESTE On/Off (IRONOFF) Dual Handwriting Database, C. Viard-Gaudin and P. M. Lailican, Proceedings of the Fifth International Conference on Document Analysis and Recognition, 1999.
Evernote Corp., "ritePen 3.0 Manual," (Web Page), 2009, retrieved Apr. 7, 2010 at http://www.ritescript.com/Manuals/ritePenManual30.aspx#Macros.

* cited by examiner

SYSTEM AND METHOD FOR USING PAPER AS AN INTERFACE TO COMPUTER APPLICATIONS

RELATED APPLICATIONS

Benefit is claimed under 35 U.S.C. 119(a)-(d) to Foreign application Serial No. 2185/CHE/2010 entitled "SYSTEM AND METHOD FOR USING PAPER AS AN INTERFACE TO COMPUTER APPLICATIONS" by Hewlett-Packard Development Company, L.P., filed on Jul. 31, 2010, which is herein incorporated in its entirety by reference for all purposes.

BACKGROUND

Paper can be a very useful and simple on-ramp to computing for non-tech savvy users prior to using computer applications. Even for those who are computer savvy, paper can help simplify the overall experience when using the computer applications.

Multifunction devices, also known as All-In-One (AiO) devices, connected to personal computers (PCs) and PCs including cameras that can enable paper as an interface are becoming popular, both for the home and the office. Such devices as part of their basic functions of printing, etc., can also scan and/or camera capture pointed data in papers. For example, in the case of an AiO connected to a PC, with the PC normally acting as a master sending data to be printed on the AiO or the PC acting as a slave receiving data that is scanned from the AiO, the AiO could further enable much simpler interfaces to the PC. For example, a scanned paper using well defined handwritten annotations can trigger computer applications on a PC and also provide data from the scanned paper to the triggered computer applications.

The existing techniques describe scanning data in paper and linking to computer applications residing in PCs, however, they do not go beyond linking the computer applications residing in PCs, i.e., they do not provide scanned data from the scanned paper to the triggered computer applications. Further, the existing techniques do not provide simpler interfaces where paper can use the well defined handwritten annotations to provide data to applications and perform subsequent actions that can be carried out by the applications.

BRIEF DESCRIPTION OF THE DRAWINGS

Various embodiments are described herein with reference to the drawings, wherein.

The drawings described herein are for illustration purposes only and are not intended to limit the scope of the present subject matter in any way.

DETAILED DESCRIPTION

A system and method for using paper as an interface to computer applications is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The process of scanning or camera capturing content in a document and linking one or more computer applications described herein analyzes the content in the scanned and/or camera captured document, links it to the one or more computer applications, and carries out subsequent operations/actions associated with the one or more computer applications based on the analysis of the scanned and/or camera captured content. Further, in one embodiment, the process analyzes content provided in a standard format that can be imported by a third party computer application, such as sending data to a web-application from the scanned content that is in standard format.

According to another embodiment of the present invention, a pre-defined form may also be used to interface with a computer application. The pre-defined form is imaged for interpreting pre-defined handwritten commands, associated syntax and data entered in the pre-defined form. Further, data entered in the pre-defined form may be extracted by matching the imaged content in the pre-defined form with a template of the computer application. Using the extracted data, the computer application may be executed. The extracted data is also imported into the computer application. In other words, the process analyzes content provided in the pre-defined form that can be imported by a third party computer application, such as sending data to a web-application.

The terms "paper" and "document" are used interchangeably throughout the description. Also, the terms "application" and "computer application" are used interchangeably throughout the description. Further, the term "annotations" refers to at least one of pre-defined handwritten commands, associated syntax, one or more computer application identifiers and pointed data on the paper/pre-defined form.

Figure 1:
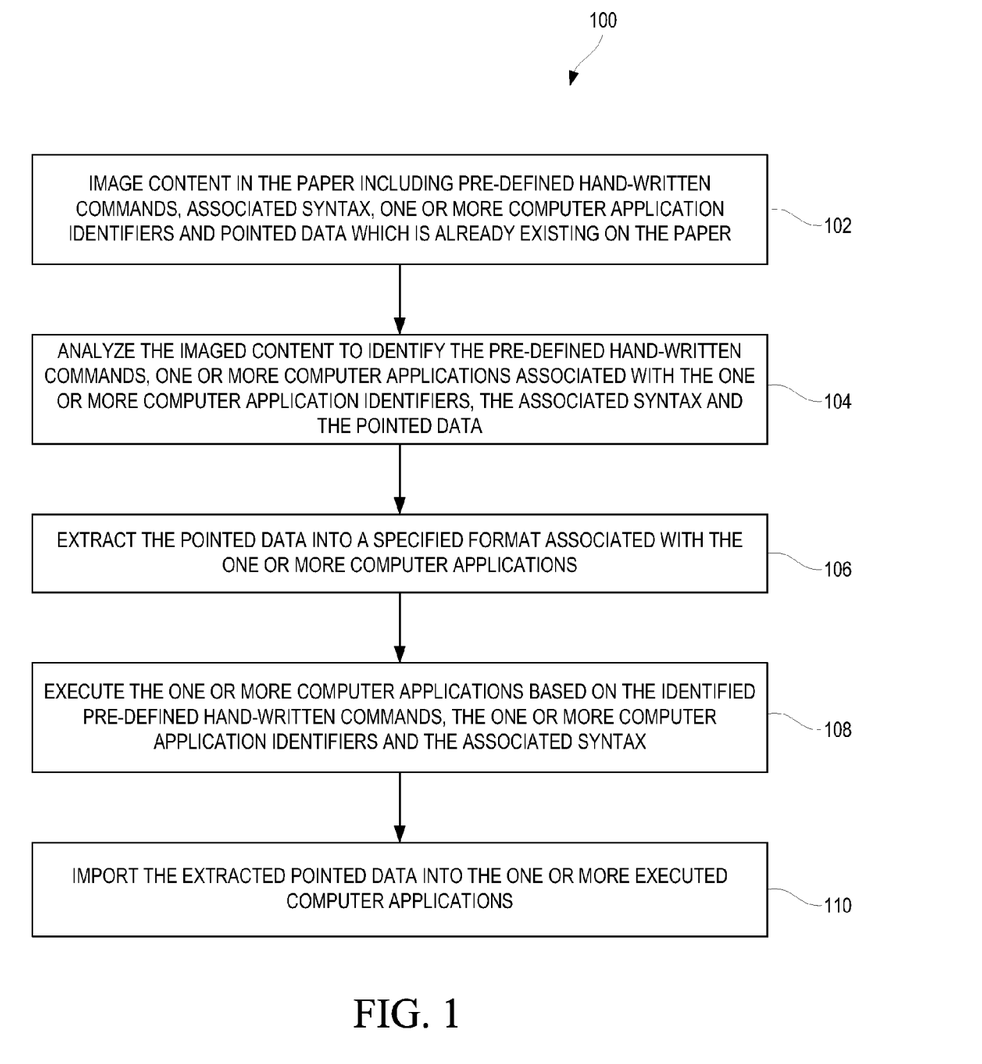
FIG. 1 illustrates a computer implemented flow diagram of an exemplary method of using data on paper to interface with one or more computer applications, according to one embodiment.

FIG. 1 illustrates a computer implemented flow diagram 100 of an exemplary method of using content on paper to interface with one or more computer applications, according to one embodiment. At step 102, content in the paper including pre-defined handwritten commands, associated syntax, one or more computer application identifiers and pointed data which already exists on the paper is imaged. The pre-defined handwritten commands include handwritten annotations selected from the group consisting of a start, send, launch, email and other user defined commands. Also, the pre-defined handwritten commands may include symbols and text. Alternatively, machine printed commands can also be used instead of the handwritten commands. The pointed data may include handwritten data and/or machine printed data such as text, images, symbols, etc. In one example embodiment, the pointed data may refer to data to be sent or imported to a computer application. The associated syntax includes handwritten annotations and symbols. Further, the symbols associated with the syntax include but not limited to arrows, braces, stars, ticks, cross marks, and parallel lines. The computer application identifiers include identifiers associated with the computer application such as EXCEL, GIMP, WORD, EMAIL, PPT, Notepad and the like. The pre-defined handwritten commands, the associated syntax, the one or more computer application identifiers and the pointed data are illustrated in FIGS. 2-6.

In one example embodiment, the content in the paper is imaged by scanning the content in the paper for detecting and interpreting the pre-defined handwritten commands, the one or more computer application identifiers, the associated syntax and the pointed data. For example, the content in the paper may be scanned using an All-in-One (AiO) device for detecting and interpreting the pre-defined handwritten commands, the one or more computer application identifiers, the associated syntax and the pointed data. The AiO device may include a scanner or other user input devices having capability to scan the content in the paper.

In another example embodiment, the content in the paper is imaged by camera capturing the content in the paper for detecting and interpreting the pre-defined handwritten commands, the one or more computer application identifiers, the associated syntax and the pointed data. For example, the content in the paper is camera captured using a camera disposed on a personal computer for interpreting the pre-defined handwritten commands, the one or more computer application identifiers, the associated syntax and the pointed data. The content in the paper can also be camera captured using a webcam, a mobile device having a camera, and so on.

At step 104, the imaged content is analyzed to identify the pre-defined handwritten commands, one or more computer applications associated with the one or more computer application identifiers, the associated syntax and the pointed data. In one example embodiment, the imaged content is analyzed using algorithms selected from the group consisting of an ink extraction algorithm, optical character recognition (OCR) algorithm, handwriting recognition (HWR) algorithm, handwritten keyword selection algorithm, and bar code extraction algorithm.

In accordance with the above described embodiments with respect to steps 102 and 104, a user can scan or camera capture content in a document (e.g., paper) that contains handwritten commands indicating the launch of a specific computer application.

At step 106, the pointed data is extracted into a specified format associated with the one or more computer applications. Exemplary computer applications include EXCEL, GIMP, WORD, EMAIL, PPT, Notepad, and so on. The computer applications can also include but not limited to mobile applications. In one embodiment, the user may add annotations for selecting data (e.g., pointed data 208 of FIG. 2) from the scanned document. Further, the AiO device or the scanner extracts the selected data from the paper using methods such as the ink extraction algorithm, the optical character recognition (OCR) algorithm, the handwriting recognition (HWR) algorithm, the handwritten keyword selection algorithm, and the bar code extraction algorithm.

Further, the extracted data is then 'intelligently' mapped to data input required for the computer application. In one example embodiment, in case of a text block (e.g., printed text) being sent to a word processing application, the data may just be sent as input to the computer application. In another embodiment, in case of a handwritten text (e.g., handwritten table of FIG. 2) being sent to a spreadsheet application, the extracted data will be mapped to a grammar of the specified format required by the spreadsheet and the extracted data in the specified format is provided to the spreadsheet.

Once data is extracted from the scanned document, the AiO device may prompt the user to review the extracted results. In one example embodiment, a mechanism could be provided for the user to accept the data, alter the data, or reject the data. In another example embodiment, a default action may be performed such as sending the image or the data to the computer application without user review.

Figure 2:
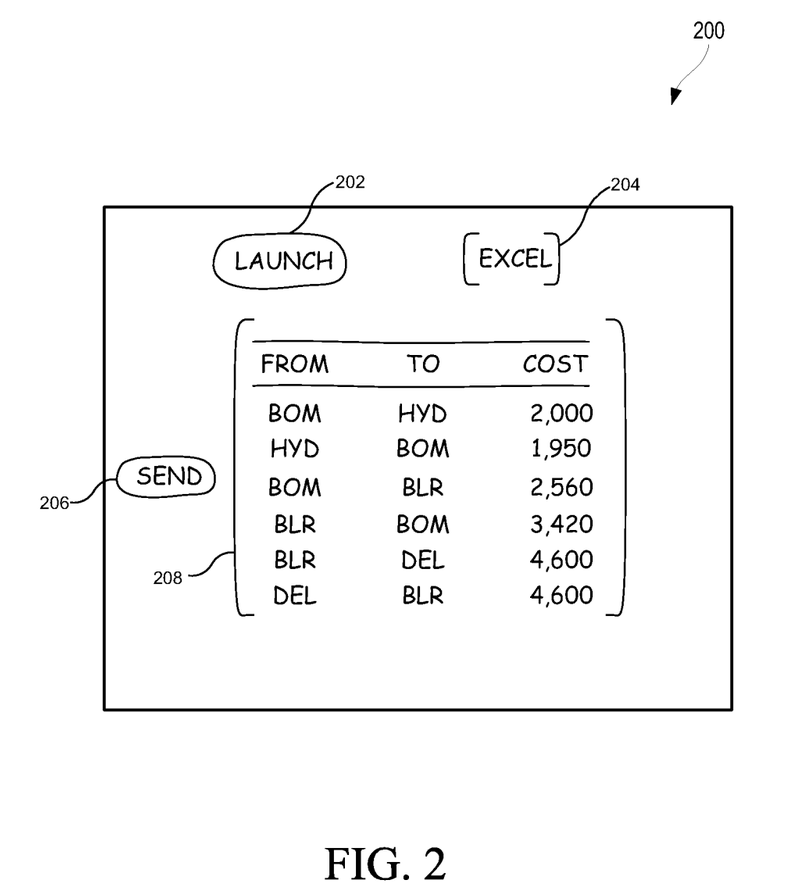
FIG. 2 illustrates a scanned document including a command to start a computer application and associated data to be read into the computer application, according to one embodiment.

At step 108, the one or more computer applications are executed based on the identified pre-defined handwritten commands, the one or more computer application identifiers and the associated syntax. At step 110, the extracted pointed data is imported into the one or more executed computer applications. For example, FIG. 2 shows an example document 200 that indicates how a computer application "Microsoft office Excel" be launched and the corresponding pointed data be sent to an Excel sheet. Some of the examples for launching different computer applications using the paper as an interface are explained in greater detail in FIGS. 2-6.

In accordance with the steps 108 and 110, several methods are documented to enable the entry of data from one computer application to another computer application. Such methods can also be utilized to transfer data from the AiO device to a computer application residing on the personal computer (PC). For example, the Microsoft clipboard format [i.e., Microsoft clipboard] provides details of how to export data from a non-Microsoft application into a Microsoft application. Once the AiO device determines a target computer application (i.e., the computer application to be launched), it will convert extracted data in the step 106 into a format suitable for the target computer application using such established standards. The AiO device may also export data extracted from step 106 in a publicly-declared format using methods such as extensible markup language (XML), and so on. Further, the computer applications can write suitable plug-ins to accept the XML formatted data being sent from the AiO device.

In yet another embodiment, the scanned document may be processed in batch mode and data sent to a computer application that is on a cloud. For example, a user may choose to process several documents like bills and input them into an accounting application in the cloud. In this case, information is extracted in batch mode and the computer application on the cloud, such as a SAP database is populated. The computer application can also be a Cloud Service, such as a personal expense application [MINT] hosted as Service on the Cloud.

In another embodiment, a pre-defined form including content can also be used to interface with a computer application. In this case, the content in the pre-defined form, filled data entered in the pre-defined form, and an associated computer application is imaged. For example, the content in the pre-defined form is imaged by scanning or by camera capturing the content in the pre-defined form for identifying and interpreting the annotations and the filled data. The annotations include commands and the computer applications/uniform resource locator (URL). An example of pre-defined form is explained in greater detail in FIG. 7.

In these embodiments, application providers may choose to provide users with pre-defined forms for different computer applications. Once the user fills out the pre-defined form, the pre-defined form can be processed by the AiO device as described above. In case of such pre-printed forms or pre-defined forms, an annotation indicating the computer application may be replaced by specific machine readable information. In these embodiments, an agent resides on a personal computer (PC) or wherever the computer application is residing to collect or store the information associated with the computer application received from this step in order to launch the appropriate computer application. In one example embodiment, the computer application can include a web-application.

Further, the filled data entered in the pre-defined form is extracted by matching the imaged content in the pre-defined form with a template of a blank form including known field IDs. In these embodiments, the pre-defined form is matched against the template for the computer application and information is extracted and provided in a pre-defined format specified for that computer application. For example, the pre-defined form provides some options such as check boxes which allow interactions which would have otherwise needed complex menu navigation and selection to be made easier by check extracting and recognizing these annotations. The pre-defined form may also include a template that matches an electronic layout. For example, a table on the form could match the cells of a spreadsheet that needs to be created.

Furthermore, the imaged content is analyzed to identify annotations. Also, the computer application is executed based on the identified annotations. In addition, the extracted filled data entered in the pre-defined form is imported into the executed computer application.

In these embodiments, the pre-defined forms can also be created by an authoring tool. For example, the authoring tool allows the user to design/create these forms and map contents of the forms to an XML format that needs to be generated once the information from the form is extracted. If the user is not using the pre-defined forms the authoring tool can be used to define the XML format where the extracted data from paper needs to be matched against during this step.

In yet another embodiment, application providers may choose to provide users with pre-formatted paper forms (i.e., pre-defined forms). Once the user fills out this form, the form can be processed by the AiO device using steps described above. In the case of such pre-printed forms, the annotation indicating the computer application may be replaced by specific markings on the form. These markings could be a barcode, a specific format of the form, logos or other artifacts. The user may indicate the presence of such markings to trigger the computer application. In these embodiments, the AiO device may also need to provide user interface choices to specify the PC to which the data has to be sent. If a scanner is attached to a single PC (for example USB), data could be sent to the connected PC. If the scanner is connected to a network, the user can specify the PC by keying in the IP address or other unique identifier for the PC.

FIG. 2 illustrates a scanned document 200 including a command to start a computer application and associated data (e.g., pointed data 208) to be read into the computer application, according to one embodiment. Particularly, FIG. 2 illustrates pre-defined handwritten commands such as a launch command 202 and a send command 206 having an associated syntax. The syntax includes annotations and symbols such as arrows, braces and so on. Further, FIG. 2 illustrates a computer application identifier "excel" 204, and pointed data 208. In one embodiment, pre-defined handwritten commands, application identifiers, and pointed data could also for instance include commands in local languages that can be customized by an end user.

As illustrated in FIG. 2, the handwritten commands 202 and 206 are written in the scanned document 200 in a pre-defined notation of being circled (i.e., syntax) to provide demarcation. Further, the handwritten command "launch" 202 within the circle is followed by the computer application identifier "excel" 204 within square brackets. Furthermore, the handwritten command "send" 206 within the circle is followed by the pointed data 208 within square brackets. In another example embodiment, other ways of identifying that a marking is for interpretation by the scanner can be used. For example, the other ways may include specific colors, shapes, or unusual symbols which will not appear in typical documents. Similarly, the whole document may be analyzed so that the user can write the annotations anywhere there is a blank space of sufficient size, or else other specific areas can be used.

In the example embodiment illustrated in FIG. 2, the content in the document 200 including launch and send commands 202 and 206, the computer application identifier "excel" 204 and pointed data 208 is imaged by scanning the document 200 using an All-in-One (AiO) device or camera capturing the content in the document 200 using a camera disposed on a personal computer or a webcam. In this example, the pointed data 208 includes handwritten data (e.g., handwritten table).

Further, the imaged/scanned document 200 is analyzed to identify the launch and send commands 202 and 206, a computer application associated with the computer application identifier "excel" 204, and the pointed data 208. Furthermore, the pointed data 208 is extracted and mapped to a grammar of the specified format associated with the computer application. For example, the computer application illustrated in FIG. 2 is Microsoft® Excel. The Microsoft® Excel is executed/launched based on the launch and send commands 202 and 206, computer application identifier "excel" 204 and the associated syntax. In addition, the extracted pointed data 208 in the specified format is imported into the Microsoft® Excel. In other words, a paper or scanned document 200 is used as an interface to send data from the paper or scanned document 200 to different computer applications based on the analysis of the handwritten annotations in the paper. In another embodiment, the paper or scanned document 200 can also be used as an interface to send data to a web-application based on the analysis of the handwritten annotations in the paper.

Figure 3:
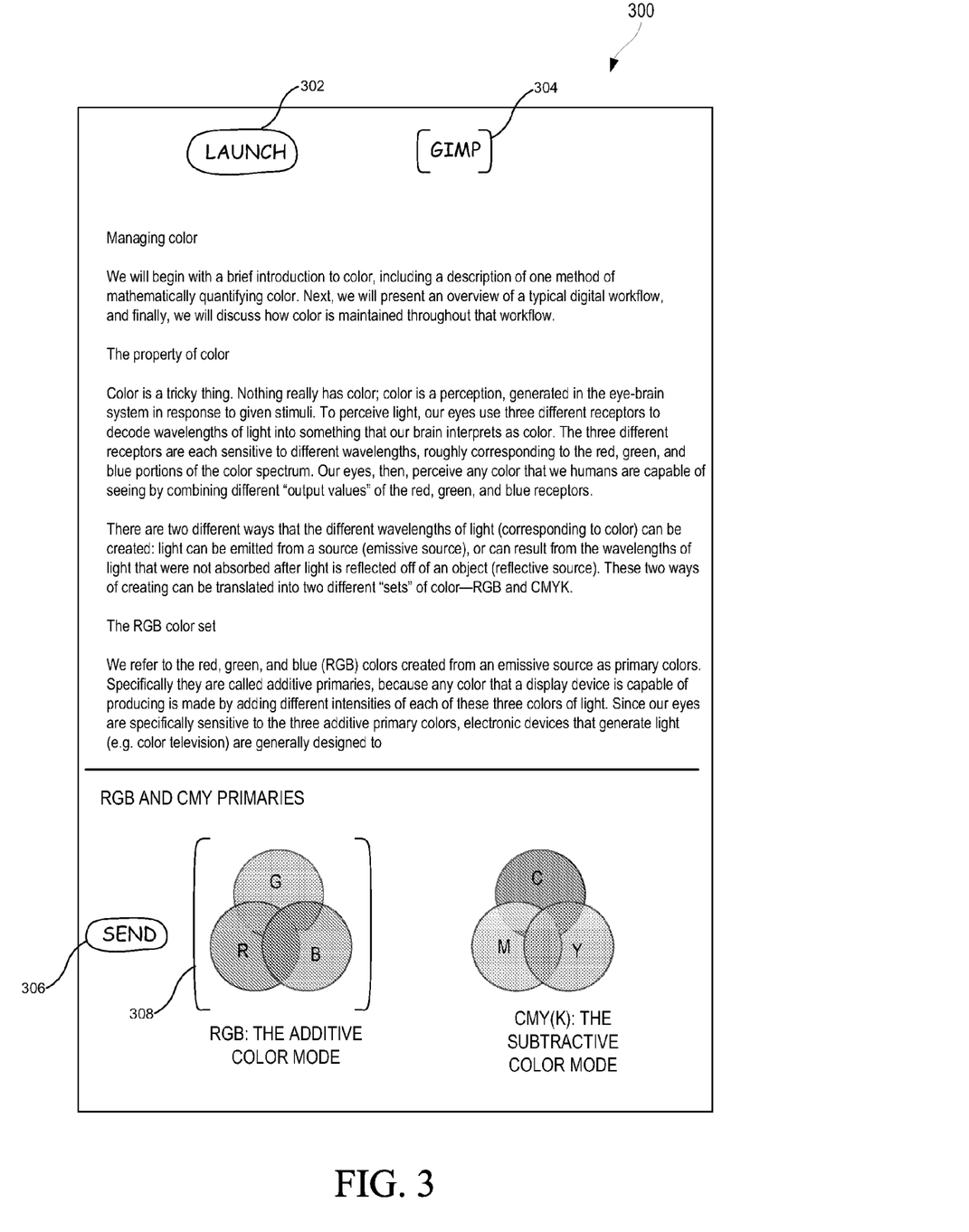
FIG. 3 illustrates a scanned document including a command to launch a computer application called "gimp" and associated data to be sent to the computer application, according to one embodiment.

FIG. 3 illustrates a scanned document 300 including a command to launch a computer application called "GIMP (GNU Image Manipulation Program)" 304 and the associated data (e.g., pointed data 308) to be sent to the computer application, according to another embodiment. Particularly, FIG. 3 illustrates pre-defined handwritten commands such as a launch command 302 and a send command 306. Further, FIG. 3 illustrates a computer application identifier "GIMP" 304, and pointed data 308. For example, the pointed data 308 may include an image data.

In the example embodiment illustrated in FIG. 3, the content in the document 300 is imaged and analyzed to identify the launch and send commands 302 and 306, a computer application associated with the computer application identifier "GIMP" 304, and the pointed data 308. Furthermore, the pointed data 308 is extracted into a specified format associated with the computer application. For example, the computer application illustrated in FIG. 3 is a GNU Image Manipulation Program (GIMP) which is an image retouching and editing tool. The GIMP application is executed and the extracted pointed data 308 in the specified format is sent to the GIMP application.

Figure 4:
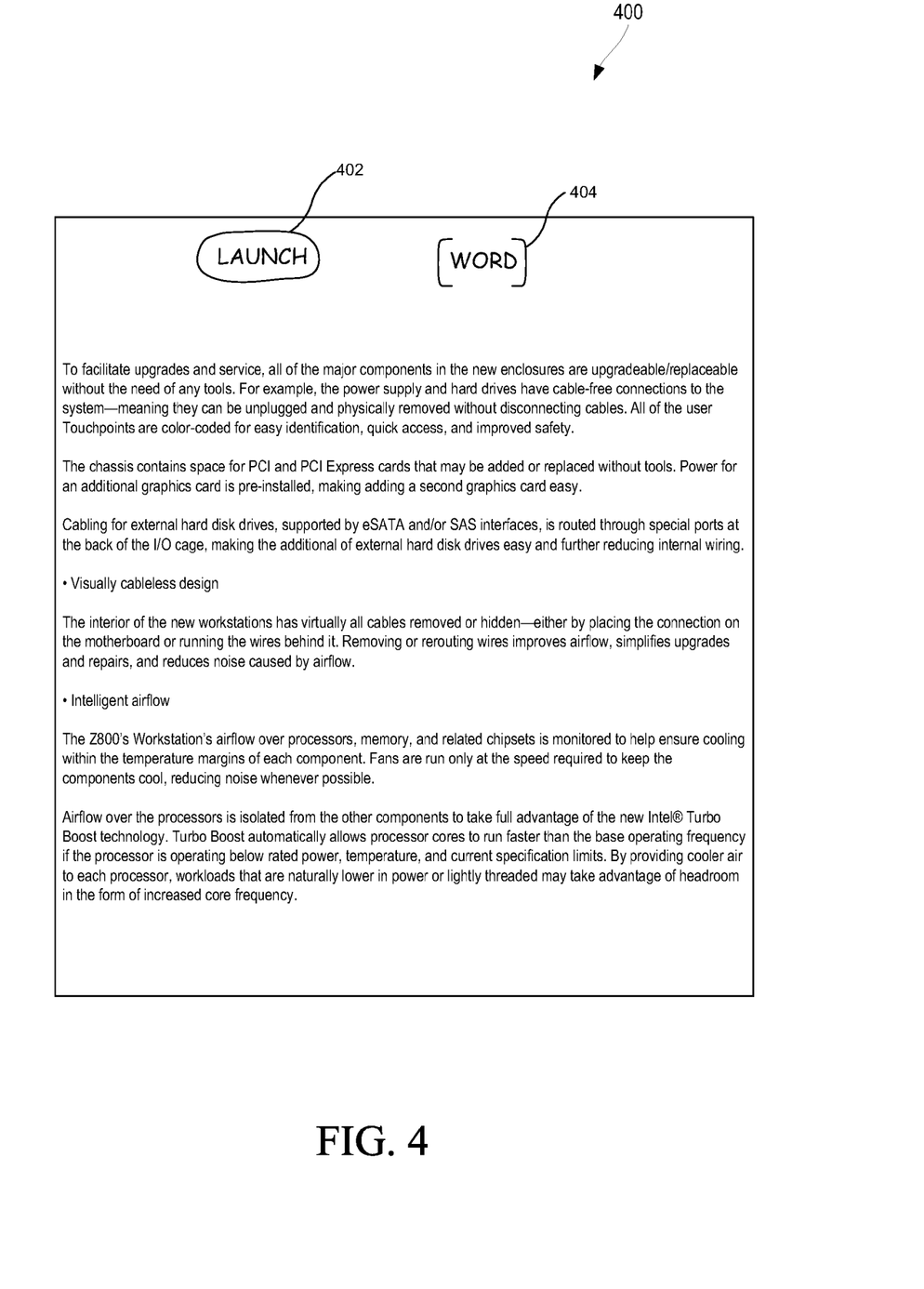
FIG. 4 illustrates another scanned document including a command to launch a word application followed by an optical character recognition (OCR) application to process associated data in the entire document for sending to the word application, according to one embodiment.

FIG. 4 illustrates another scanned document 400 including a command to launch a word application followed by an optical character recognition (OCR) application to process the associated data in the entire document for sending to the word application, according to another embodiment. Particularly, FIG. 4 illustrates a pre-defined handwritten command "launch" 402 and a computer application identifier "word" 404.

In the example embodiment illustrated in FIG. 4, the content in the document 400 is imaged and analyzed to identify the launch command 402 and a computer application associated with the computer application identifier "word" 404. For example, the computer application illustrated in FIG. 4 is "Microsoft® word". In these embodiments, optical character recognition (OCR) will be launched to process content of the entire document 400 and the OCR results will be sent to the Microsoft® word application.

Figure 5:
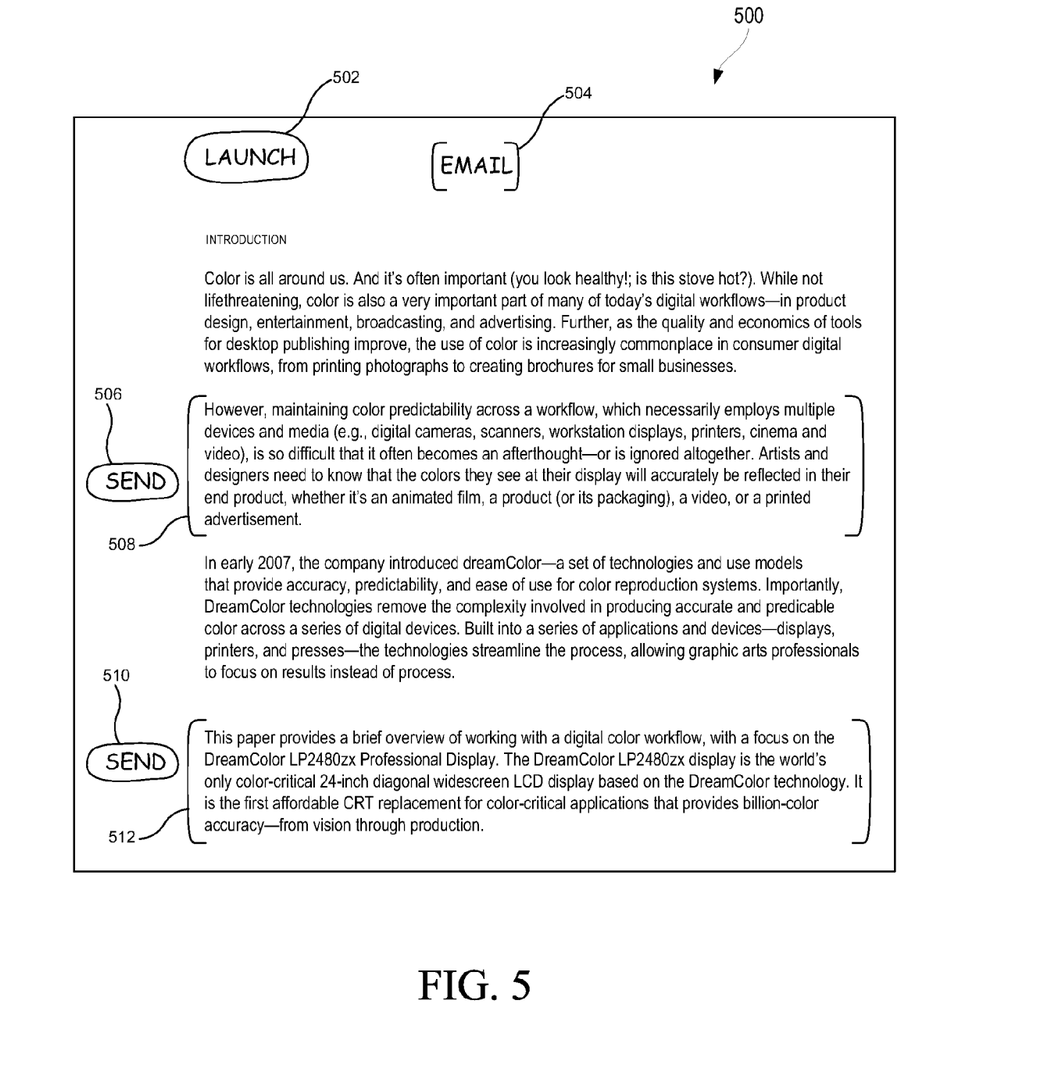
FIG. 5 illustrates another scanned document including a command to launch an email application and content included within square brackets to be OCRed and sent to the email application, in the context of the present invention.

FIG. 5 illustrates another scanned document 500 including a command to launch an email application and content included within the square brackets to be OCRed and sent to the email application, in the context of the present invention. Particularly, FIG. 5 illustrates pre-defined handwritten commands such as a launch command 502 and send commands 506 and 510. Further, FIG. 5 illustrates a computer application identifier "email" 504, and pointed data 508 and 512. For example, the pointed data 508 and 512 includes a printed text data. In one example embodiment, the send commands 506 and 510 are followed by the pointed data 508 and 512 within square brackets, respectively.

In the example embodiment illustrated in FIG. 5, the content in the document 500 is imaged and analyzed to identify the launch and send commands 502, 506, and 510, a computer application associated with the computer application identifier "email" 504, and the pointed data 508 and 512. Furthermore, only the pointed data 508 and 512 within the square brackets is extracted into a specified format associated with the computer application. In these embodiments, the content included within the square brackets is OCRed. The OCR results (i.e., extracted pointed data 508 and 512 in the specified format) will be sent to the email application.

In another embodiment, the data in the scanned document can be sent to more than one computer application based on the identified pre-defined handwritten commands, the one or more computer application identifiers and the associated syntax. For example, the pointed data 508 within the square brackets can be sent to an email application and the pointed data 512 within the square brackets can be sent to a Microsoft® word application and so on using multiple handwritten commands and associated computer application identifiers in the document.

Figure 6:
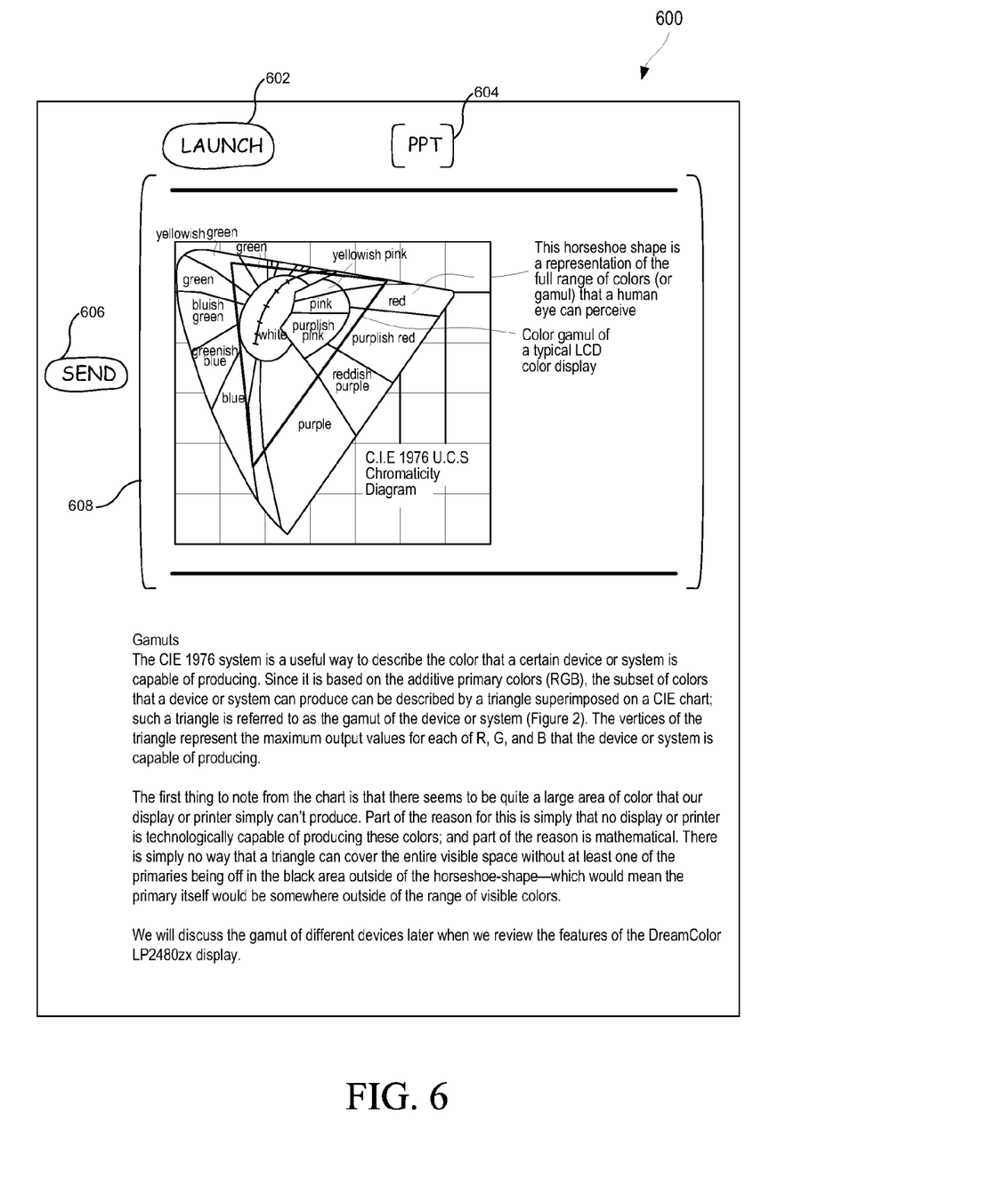
FIG. 6 illustrates another document including a command to launch a presentation application, such as a Microsoft® PowerPoint and to send content included in square brackets to the Microsoft® PowerPoint, in the context of the present invention.

FIG. 6 illustrates another document 600 including a command to launch a presentation application, such as a Microsoft® PowerPoint and to send content included in square brackets to the Microsoft® PowerPoint, in the context of the present invention. Particularly, FIG. 6 illustrates pre-defined handwritten commands such as a launch command 602 and a send command 606. Further, FIG. 6 illustrates a computer application identifier "PPT" 604, and pointed data 608. For example, the pointed data 608 may include an image data.

In the example embodiment illustrated in FIG. 6, the content in the document 600 is imaged and analyzed to identify the launch command 602 and the send command 606, a computer application associated with the computer application identifier "PPT" 604, and the pointed data 608. For example, the computer application illustrated in FIG. 6 is the Microsoft® PowerPoint. The pointed data 608 (i.e., image within the square brackets) is extracted into a specified format associated with the Microsoft® PowerPoint. The Microsoft® PowerPoint application is executed/launched and the extracted pointed data 608 in the specified format is sent to the Microsoft® PowerPoint application.

Figure 7:
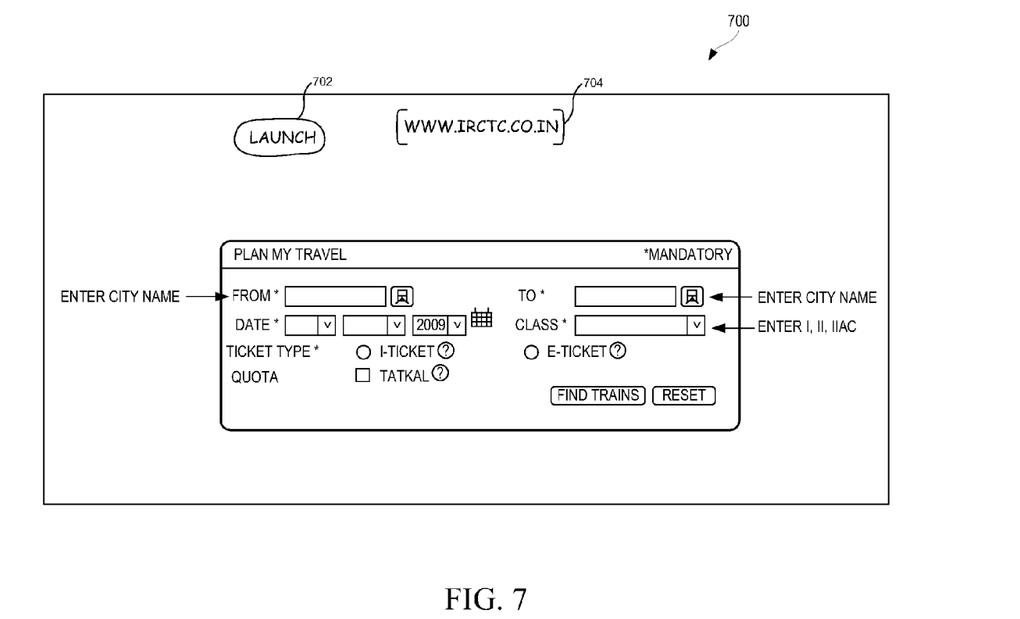
FIG. 7 illustrates a pre-defined paper form that can be used to launch an associated computer application and to transfer associated data for booking a train ticket, according to one embodiment.

FIG. 7 illustrates a pre-defined paper form 700 that can be used to launch an associated computer application and to transfer associated data for booking a train ticket, according to one embodiment. In the example embodiment, the pre-defined form for booking the train ticket includes a command launch 702 and a computer/web application identifier "URL" 704 with in square brackets followed by the launch command 702. Also, the pre-defined form includes machine readable data/field IDs such as starting city name, destination city name, and date of journey and so on required to be filled in by a user.

Once the data is filled, the content in the pre-defined form, filled data entered in the pre-defined form, and an associated computer application is imaged. In one example embodiment, the content in the pre-defined form is imaged by scanning the content in the pre-defined form for identifying and interpreting the annotations and the filled data. In another example embodiment, the content in the pre-defined form is imaged by camera capturing the content in the pre-defined form for identifying and interpreting the annotations and the pointed data. For example, the annotations include commands and the computer applications/uniform resource locator (URL).

Further, the filled data entered in the pre-defined form is extracted by matching the imaged content in the pre-defined form with a template of a blank form including the known field IDs for the computer or web based application. Further, the imaged content is analyzed to identify annotations such as "launch" 702 followed by "URL" 704. The URL in this example includes "www.irctc.co.in". Further, the web application "www.irctc.co.in" is executed based on the identified annotations. In addition, the extracted filled data entered in the pre-defined form is imported into the executed web application.

Figure 8:
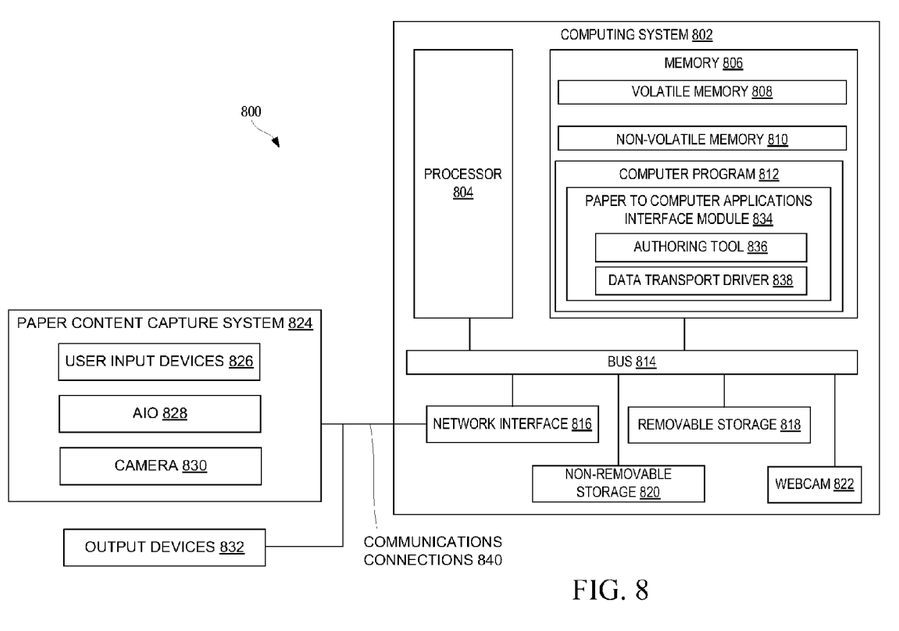
FIG. 8 illustrates an example of a suitable computing system environment for implementing embodiments of the present subject matter, according to one embodiment.

FIG. 8 shows an example of a suitable computing system environment 800 for implementing embodiments of the present subject matter. FIG. 8 and the following discussion are intended to provide a brief, general description of a suitable computing environment in which certain embodiments of the inventive concepts contained herein may be implemented.

A general computing system 802, in the form of a personal computer or a mobile device may include a processor 804, memory 806, a removable storage 818, and a non-removable storage 820. The computing system 802 additionally includes a bus 814, a network interface 816 and a webcam 822. The computing system 802 may include or have access to the computing system environment 800 that includes a paper content capture system 824, one or more output devices 832, and one or more communication connections 840 such as a network interface card or a universal serial bus connection.

The paper content capture system 824 includes an All-in-One (AiO) device 828, a camera 830, and/or one or more user input devices 826. The one or more user input devices 826 may be a digitizer screen and a stylus, trackball, keyboard, keypad, mouse, and the like. The one or more user input devices 826 may also include a mobile device having a camera. The one or more output devices 832 may be a display device of the personal computer or the mobile device. The communication connections 840 may include a local area network, a wide area network, and/or other networks.

The memory 806 may include volatile memory 808 and non-volatile memory 810. A variety of computer-readable storage media may be stored in and accessed from the memory elements of the computing system 802, such as the volatile memory 808 and the non-volatile memory 810, the removable storage 818 and the non-removable storage 820. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 804, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 804 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 804 of the computing system 802. For example, a computer program 812 may include machine-readable instructions capable of using paper to interface with one or more computer applications, according to the teachings and herein described embodiments of the present subject matter. In one embodiment, the computer program 812 may be included on a compact disk-read only memory (CD-ROM) and loaded from the CD-ROM to a hard drive in the non-volatile memory 810. The machine-readable instructions may cause the computing system 802 to encode according to the various embodiments of the present subject matter.

As shown, the computer program 812 includes a paper to computer applications interface module 834. The paper to computer applications interface module 834 further includes an authoring tool 836 and a data transport driver 838.

In one embodiment, the system 800 includes a network (e.g., the communications connections 840), the paper content capture system 824, the processor 804 coupled to the paper content capture system 824 via the network. In these embodiments, the network may be a wireless or wired network.

Further, as described above, the system 800 also includes the paper to computer applications interface module 834. Furthermore, the paper to computer applications interface module 834 includes the authoring tool 836 for allowing a user to create user defined handwritten commands. In these embodiments, the authoring tool 836 is capable of authoring the user defined handwritten commands for mapping data to the computer application. In one embodiment, the user may define the handwritten commands and map the handwritten commands as required. For example, "From", "To", "Body" can be used to mark content for an email application. These handwritten commands could also for instance be commands in local languages that can be customized by the user. In another embodiment, the authoring tool 836 allows templates to be authored for different computer applications. For example, a predefined form for sending an email can be authored to be used by the user with or without the handwritten commands. In yet another embodiment, the authoring tool 836 can read a format of the handwritten commands that is acceptable by an electronic application such as XML format (e.g., which specifies "From", "To" and "Body" for an email application), and allows the user to map the handwritten commands and content to this format.

The system 800 also includes the memory 806 operatively coupled to the processor 804. For example, the memory 806 includes the user defined handwritten commands and pre-defined handwritten commands. The memory 806 also includes the paper to computer applications interface module 834 having instructions capable of imaging content in the paper using the paper content capture system 824. The content includes handwritten commands, associated syntax, one or more computer application identifiers and pointed data.

The instructions further capable of identifying the handwritten commands, one or more computer applications associated with the one or more computer application identifiers, the associated syntax and the pointed data using the paper to computer applications interface module 834. Further, the instructions capable of mapping the identified handwritten commands to handwritten commands selected from the group consisting of the user defined handwritten commands and the pre-defined handwritten commands using the authoring tool 836.

Also, the instructions capable of extracting the pointed data into a specified format associated with the one or more computer applications using the paper to computer applications interface module 834, executing the one or more computer applications based on the identified and mapped pre-defined handwritten commands, the one or more computer application identifiers and the associated syntax using the paper to computer applications interface module 834, and importing the extracted pointed data into the one or more executed computer applications using the data transport driver 838 in the paper to computer applications interface module 834.

For example, the paper to computer applications interface module 834 may be in the form of instructions stored on a non-transitory computer-readable storage medium. The non-transitory computer-readable storage medium having the instructions that, when executed by the computing system 802, may cause the computing system 802 to perform one or more methods described in FIGS. 1 through 8.

In various embodiments, the systems and methods described in FIG. 1 through FIG. 8 allow users to perform simple actions on a computer by writing instructions on a paper and using the AiO device as input to the computer. The above described systems and methods also allow users to add application-specific data from a scanned document. In this case, certain tasks have simple interactions, for example tagging of photographs, selecting amount and date field from invoice, etc., that can be completed on the AiO device. Such annotations and interactions are more intuitive using handwritten interface.

Further, the above described systems and methods for filling out a pre-printed form could allow a user to provide instructions in a local language thus enabling easier interfacing to the application. Furthermore, the above described systems and methods allow extracted data to be exported in a public format that can be used by third-party applications. Currently, the only information sent out by the AiO device is the image itself, with some minimal meta-data in the case of digital sending devices. The exported data from the AiO device could include enhanced meta-data such as user intent regarding a target application, recognized handwritten content on the document, or recognized document content.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for using a paper to interface with one or more computer applications, comprising:
    capturing an image of content on the paper, the content existing on the paper prior to the capturing and including pre-defined handwritten commands, associated syntax, one or more computer application identifiers and pointed data;
    analyzing the content of the captured image to identify the pre-defined handwritten commands, the one or more computer applications associated with the one or more computer application identifiers, the associated syntax and the pointed data;
    extracting the pointed data into a specified format associated with the one or more computer applications;
    executing the one or more computer applications based on the identified pre-defined handwritten commands, the one or more computer application identifiers and the associated syntax; and
    importing the extracted pointed data into the one or more executed computer applications.

2. The method of claim 1, wherein capturing the image of the content on the paper comprises:
    scanning the content in the paper for detecting and interpreting the pre-defined handwritten commands, the one or more computer application identifiers, the associated syntax and the pointed data.

3. The method of claim 2, wherein scanning the content in the paper comprises:
    scanning the content in the paper using an All-in-One (AiO) device for detecting and interpreting the pre-defined handwritten commands, the one or more computer application identifiers, the associated syntax and the pointed data.

4. The method of claim 1, wherein capturing the image of the content on the paper comprises:
    camera capturing the content in the paper for detecting and interpreting the pre-defined handwritten commands, the one or more computer application identifiers, the associated syntax and the pointed data.

5. The method of claim 4, wherein camera capturing the content in the paper comprises:
    camera capturing the content in the paper using a camera disposed on a personal computer for interpreting the pre-defined handwritten commands, the one or more computer application identifiers, the associated syntax and the pointed data.

6. The method of claim 1, wherein the pre-defined handwritten commands comprise handwritten annotations selected from the group consisting of send, launch, email and other user defined commands.

7. The method of claim 1, wherein the associated syntax comprises handwritten annotations and symbols, and wherein the symbols are selected from the group consisting of arrows, braces, stars, ticks, cross marks, and parallel lines.

8. The method of claim 1, wherein analyzing the content of the captured image comprises analyzing the content of the captured image using algorithms selected from the group consisting of ink extraction algorithm, optical character recognition (OCR) algorithm, handwriting recognition (HWR) algorithm, handwritten keyword selection algorithm, and bar code extraction algorithm.

9. The method of claim 1, a full extent of the content existing on the paper prior to any capturing of the image of the content.

10. A method for using a pre-defined form including content to interface with a computer application, comprising:
    capturing an image of the content in the pre-defined form, the content provided in the pre-defined form prior to the capturing and including filled data entered in the pre-defined form, annotations made in the pre-defined form, and at least one identifier of an associated computer application made in the pre-defined form;
    extracting the filled data entered in the pre-defined form by matching the content of the captured image with a template of a blank form including known field IDs;
    analyzing the content of the captured image to identify the annotations;
    executing the computer application based on the at least one identifier and the identified annotations; and
    importing the extracted filled data entered in the pre-defined form into the executed computer application.

11. The method of claim 10, wherein capturing the image of the content in the pre-defined form comprises:
    scanning the content in the pre-defined form for identifying and interpreting the annotations and the filled data.

12. The method of claim 10, wherein capturing the image of the content in the pre-defined form comprises:
    camera capturing the content in the pre-defined form for identifying and interpreting the annotations and the filled data.

13. The method of claim 10, a full extent of the content provided in the pre-defined form prior to any capturing of the image of the content.

14. A non-transitory computer-readable storage medium for using a paper to interface with one or more computer applications having instructions that, when executed by a computing device, cause the computing device to perform a method comprising:
    capturing an image of content on the paper, the content existing on the paper prior to the capturing and including pre-defined handwritten commands, associated syntax, one or more computer application identifiers and pointed data;
    analyzing the content of the captured image to identify the pre-defined handwritten commands, the one or more computer applications associated with the one or more computer application identifiers, the associated syntax and the pointed data;

extracting the pointed data into a specified format associated with the one or more computer applications;

executing the one or more computer applications based on the identified pre-defined handwritten commands, the one or more computer application identifiers and the associated syntax; and importing the extracted pointed data into the one or more executed computer applications.

15. The non-transitory computer-readable storage medium of claim 14, wherein capturing the image of the content on the paper comprises:

scanning the content in the paper for detecting and interpreting the pre-defined handwritten commands, the one or more computer application identifiers, the associated syntax and the pointed data.

16. The non-transitory computer-readable storage medium of claim 14, wherein capturing the image of the content on the paper comprises:

camera capturing the content in the paper for detecting and interpreting the pre-defined handwritten commands, the one or more computer application identifiers, the associated syntax and the pointed data.

17. A system for using a paper to interface with one or more computer applications, comprising:

a network;

a paper content capture system;

a processor coupled to the paper content capture system via the network;

a paper to computer applications interface module, wherein the paper to computer applications interface module comprises an authoring tool for allowing a user to create user defined handwritten commands;

memory operatively coupled to the processor, wherein the memory includes the user defined handwritten commands and pre-defined handwritten commands, and wherein the memory includes the paper to computer applications interface module having instructions capable of:

capturing an image of content on the paper using the paper content capture system, wherein the content exists on the paper prior to the capturing and includes handwritten commands, associated syntax, one or more computer application identifiers and pointed data;

identifying the handwritten commands, one or more computer applications associated with the one or more computer application identifiers, the associated syntax and the pointed data by analyzing the content of the captured image using the paper to computer applications interface module;

mapping the identified handwritten commands to handwritten commands selected from the group consisting of the user defined handwritten commands and the pre-defined handwritten commands;

extracting the pointed data into a specified format associated with the one or more computer applications using the paper to computer applications interface module;

executing the one or more computer applications based on the identified and mapped pre-defined handwritten commands, the one or more computer application identifiers and the associated syntax using the paper to computer applications interface module; and importing the extracted pointed data into the one or more executed computer applications using a data transport driver in the paper to computer applications interface module.

18. The system of claim 17, wherein the paper content capture system is selected from a group consisting of AiO devices, camera on devices and web cameras.

19. The system of claim 17, wherein the paper to computer applications interface module identifies the handwritten commands, one or more computer applications associated with the one or more computer application identifiers, the associated syntax and the pointed data by analyzing the content of the captured image using algorithms selected from the group consisting of ink extraction algorithm, optical character recognition (OCR) algorithm, handwriting recognition (HWR) algorithm, handwritten keyword selection algorithm, and bar code extraction algorithm.

20. The system of claim 17, wherein a full extent of the content is materialized on the paper prior to any capturing of the image of the content on the paper with the paper content capture system.

* * * * *